United States Patent
Trajkovic et al.

(10) Patent No.: US 6,771,306 B2
(45) Date of Patent: Aug. 3, 2004

(54) METHOD FOR SELECTING A TARGET IN AN AUTOMATED VIDEO TRACKING SYSTEM

(75) Inventors: Miroslav Trajkovic, Ossining, NY (US); Damian M Lyons, Putnam Valley, NY (US); Eric Cohen-Solal, Ossining, NY (US)

(73) Assignee: Koninklijke Philips Electronics N.V., Eindoven (NL)

( * ) Notice: Subject to any disclaimer, the term of this patent is extended or adjusted under 35 U.S.C. 154(b) by 625 days.

(21) Appl. No.: 09/819,963

(22) Filed: Mar. 28, 2001

(65) Prior Publication Data

US 2002/0140813 A1 Oct. 3, 2002

(51) Int. Cl.[7] .............................. H04N 7/18; H04N 9/47
(52) U.S. Cl. ...................... 348/170; 348/143; 348/152
(58) Field of Search ................................ 348/143, 144, 348/149, 150, 135, 142, 169, 170; 715/500.1

(56) References Cited

U.S. PATENT DOCUMENTS

| | | | |
|---|---|---|---|
| 4,644,397 A | | 2/1987 | Roy et al. |
| 5,416,711 A | * | 5/1995 | Gran et al. ................. 701/117 |
| 5,610,653 A | * | 3/1997 | Abecassis .................. 348/170 |
| 5,667,474 A | | 9/1997 | Nishimura |
| 5,880,775 A | * | 3/1999 | Ross .......................... 348/143 |
| 6,144,375 A | * | 11/2000 | Jain et al. ................ 715/500.1 |
| 6,226,031 B1 | * | 5/2001 | Barraclough et al. ..... 348/14.13 |

FOREIGN PATENT DOCUMENTS

EP 0530049 A1 3/1993 ............. F41G/7/22

* cited by examiner

Primary Examiner—Gims Philippe
(74) Attorney, Agent, or Firm—Gregory L. Thorne

(57) ABSTRACT

A method for selecting a target in an automated video tracking system. The method including the steps of: displaying video image data of a scene having a target to be tracked; freezing the video image data to display a frame thereof; and selecting a desired target in the frame of the video image data. Also provided is an apparatus for selecting a target in an automated video tracking system and an automated video tracking system employing such methods and apparatus.

17 Claims, 2 Drawing Sheets

METHOD FOR SELECTING A TARGET IN AN AUTOMATED VIDEO TRACKING SYSTEM

BACKGROUND OF THE INVENTION

1. Field of the Invention

The present invention relates generally to video tracking systems and, more particularly, to a method for selecting a target in an automated video tracking system.

2. Prior Art

For purposes of this disclosure, automated tracking is defined as the automatic control of the Pan, Tilt and Zoom (PTZ) motors of a movable PTZ camera so as to keep the camera view centered on a designated, moving target. Automated tracking as defined is used in a number of different applications areas, such as surveillance and security monitoring. In this area, the target is usually a human.

Automated tracking systems typically have several parts, target selection, model generation, and camera control. A target needs to be selected for tracking. This can be via an operator or via an automated motion detection module or other intruder detection system. An internal "model" of the appearance of the target is necessary to allow the tracking system to find the target in subsequent images. A camera motion control model is necessary to determine how to move the camera to keep the target in the center of the field of view.

The present disclosure relates to the problem of target selection. Identification of potential tracking candidates (i.e., a desired target) in a video scene is typically not part of the function of an automated tracking system. For instance, in the area of surveillance, target selection requires a lot of background knowledge about the objective of any surveillance application. What looks "suspicious" in one surveillance application, e.g. a retail store, may not look suspicious in another, e.g. a parking lot.

In some applications, any source of motion is suspicious, e.g., monitoring a warehouse at night. In that case, an intrusion detection sensor, or a motion sensor, could be used to designate a target for tracking. A more sophisticated automatic monitoring system, could be used to designate targets for certain other applications, as long as the rules to select targets can be clearly enumerated and implemented. However, in general, it is expected that a human operator will indicate the target to the tracking system.

When an operator designates a person in the video image as the tracking system's target, there is a subtle difference in meaning between the operator's and the tracking system's concept of the target. The operator is designating a person as the target, however, the tracking system is simply accepting a region of the image as the target. Because of this, the operator may not be overly fussy about what part of the person he picks, since after all, its clear to any (human) observer which person he or she selects. Furthermore, the tracking system will form a target model based on exactly what image region the operator selected. As it has no independent knowledge of the desired target it cannot generalize beyond what it is told. Further problems arise because the operator is selecting a moving target, therefore he or she may select a bad target, a portion of a target, or possibly even an empty space.

SUMMARY OF THE INVENTION

Therefore it is an object of the present invention to provide a method and apparatus for selecting a target in a video tracking system which resolves the problems with the prior art video tracking systems.

Accordingly, a method for selecting a target in an automated video tracking system is provided. The method comprises the steps of: displaying video image data of a scene having a target to be tracked; freezing the video image data to display a frame thereof; and selecting a desired target in the frame of the video image data. Preferably, the method further comprises the steps of: unfreezing the video image data after the selecting step; and tracking the selected desired target in the unfrozen video image data.

The selecting step preferably comprises drawing a shape, such as a rectangle around at least a portion of the desired target with a input device, such as a computer mouse. Alternatively, the selecting step comprises indicating a region in which the desired target resides with an input device, such as using a computer mouse to click on the region.

Also provided is an apparatus for selecting a target in an automated video tracking system. The apparatus comprises: a camera for providing video image data of a scene having a desired target to be tracked; a display for displaying the video image data; means for freezing the video image data to display a frame thereof; and an input device for selecting the desired target in the frame of the video image data. Preferably, the apparatus further comprises: means for unfreezing the video image data after the desired target is selected; and an automated video tracking system having a controller for controlling the camera to track the selected desired target in the unfrozen video image data.

The input device preferably comprises means for drawing a shape, such as a rectangle around at least a portion of the desired target. Alternatively, the input device comprises means for indicating a region in which the desired target resides, such as by clicking on the region. Preferably, the input device is a computer mouse.

Also provided is a video tracking system comprising: a camera for providing video image data of a scene having a desired target to be tracked; a display for displaying the video image data; means for freezing the video image data to display a frame thereof; an input device for selecting the desired target in the frame of the video image data; means for unfreezing the video image data after the desired target is selected; and a controller for controlling the camera to track the selected desired target in the unfrozen video image data.

Preferably, the input device comprises means for drawing a shape, such as a rectangle, around at least a portion of the desired target. Alternatively, the input device comprises means for indicating a region in which the desired target resides, such as by clicking on the region. Preferably, the input device is a computer mouse.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of video tracking systems, it has been found particularly useful in the environment of security systems. Therefore, without limiting the applicability of the invention to security systems, the invention will be described in such environment. Those skilled in the art will appreciate that the methods and apparatus of the present invention also have usefulness in such areas as videoconferencing and multi-nodal interfaces for consumer devices.

Figure 1:
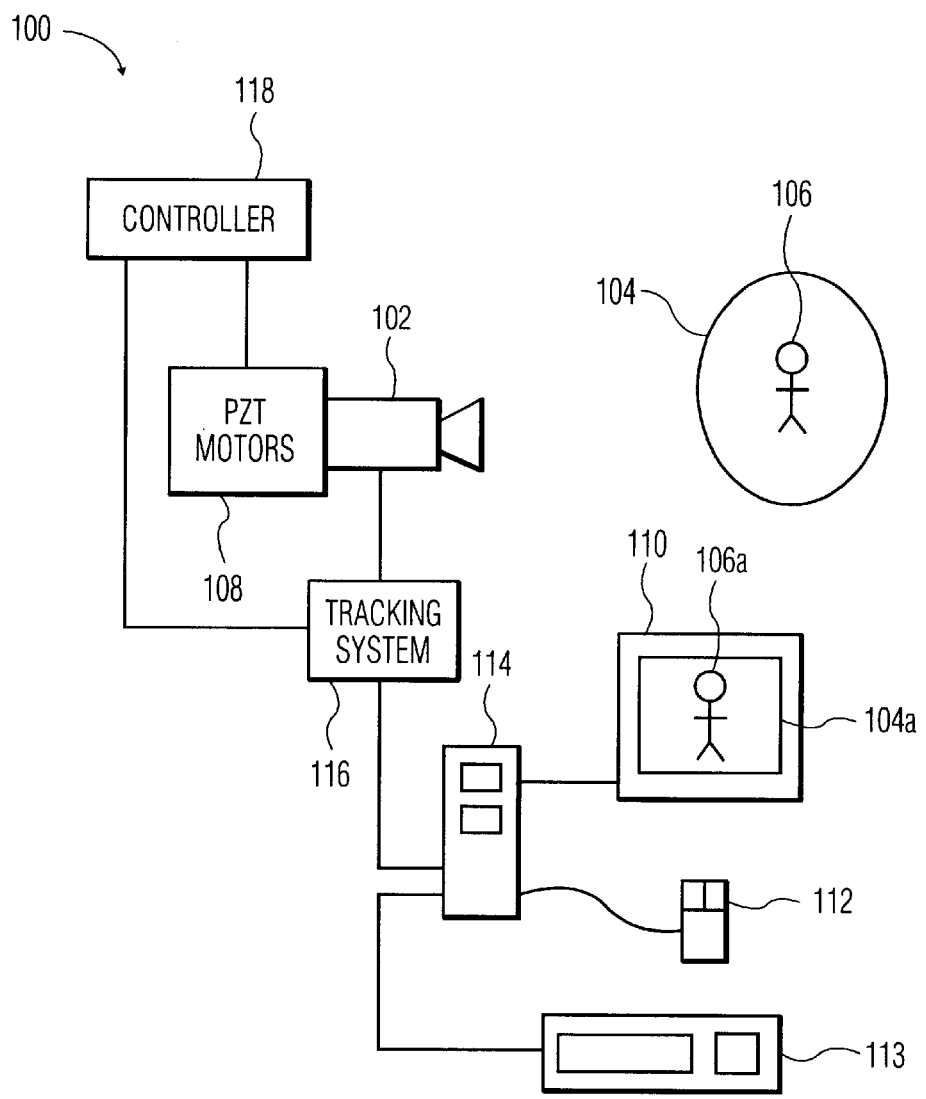
FIG. 1 illustrates a preferred video tracking system of the present invention.

Referring now to FIG. 1, there is illustrated a preferred implementation of the video tracking system of the present invention, generally referred to by reference numeral 100. The apparatus 100 comprises a camera 102 for providing video image data of a scene 104 having a desired target 106 to be tracked. The camera 102 is preferably a PTZ camera having PTZ motors 108 for controlling the pan, tilt and zoom of the camera 102. Such camera and motors for their control are well known in the art.

The apparatus 100 further includes a display, such as a computer monitor 110 for displaying the video image data of the scene 104 from the camera 102. The computer monitor's display is generally referred to herein by reference numeral 104a. An input device is used to select the desired target 106a in the video image data Reference numeral 106 is used herein to indicate the actual target while reference numeral 106a indicates the image of the target as displayed on the monitor 110. The input device is preferably a computer mouse 112 connected to a computer processor 114. However, any input device that is capable of selecting a target in the video image display can be utilized without departing from the scope or spirit of the present invention. Such other input devices can be a touchpad, touchscreen, touchpen, or even a keyboard 113 connected to the computer 114. The computer mouse 112 preferably indicates the target in the video image display by drawing a shape around at least a portion of the target 106a. Preferably, the shape is a rectangle, however, any other shape can also be used, such as an ellipse. Alternatively, other methods can be utilized for selecting a target, such as merely clicking on a region of the target 106a in the video image display and using a region-filling algorithm, such as is well know in the prior art, to locate the target region.

Once the operator has selected the target 106a, a tracking system 116 generates a model of the target 106a that can be used to locate the target 106a in successive frames of the video image data. Such tracking systems are well known in the art. Although shown separately in FIG. 1, the tracking system 116 is preferably implemented by software contained on a peripheral device (not shown) in the computer processor 114.

Typically, there are two interconnected ways in which the model is used, to distinguish the target 106a from the background scene or to distinguish the target 106a from other occluding targets. Because the model is gathered from the video image, it is clear that it can only contain information about appearance. This gives rise to the most important constraint limiting the behavior of automated tracking, referred to as the appearance constraint. In general, a target can only be successfully tracked if its appearance distinguishes it from other potential targets. In other words, if the target does not have something unique about its appearance within the kind of visual environments in which the tracker is operating, then it is not possible to build a unique "model" for that target.

Once a model of the target 106a is generated, a controller 118 is then instructed by the tracking system to control the PTZ motors 108 to move the camera to keep the selected target 106 centered in the field of view of the camera 102. Such controllers are also well known in the art. The controller 118, like the tracking system 116, is preferably implemented by software contained on a peripheral device on the computer 114. Two general approaches for controlling the camera 102 that are widely used in the prior art include a discrete approach in which the camera 102 is moved from time to time to keep the target 106 centered and a continuous approach in which the camera 102 is moved to keep the target 106 continuously centered.

Whichever approach is used to control the camera 102, the results of which are fed to the controller 118 which determines the amount of camera movement necessary to keep the target 106 centered in the field of view of the camera 102. The controller 118 outputs an appropriate signal to the PTZ motors 108 of the camera 102 to carry out its instructions to keep the target 106 centered in the camera's 102 field of view. Such systems are well known in the art.

Figure 2:
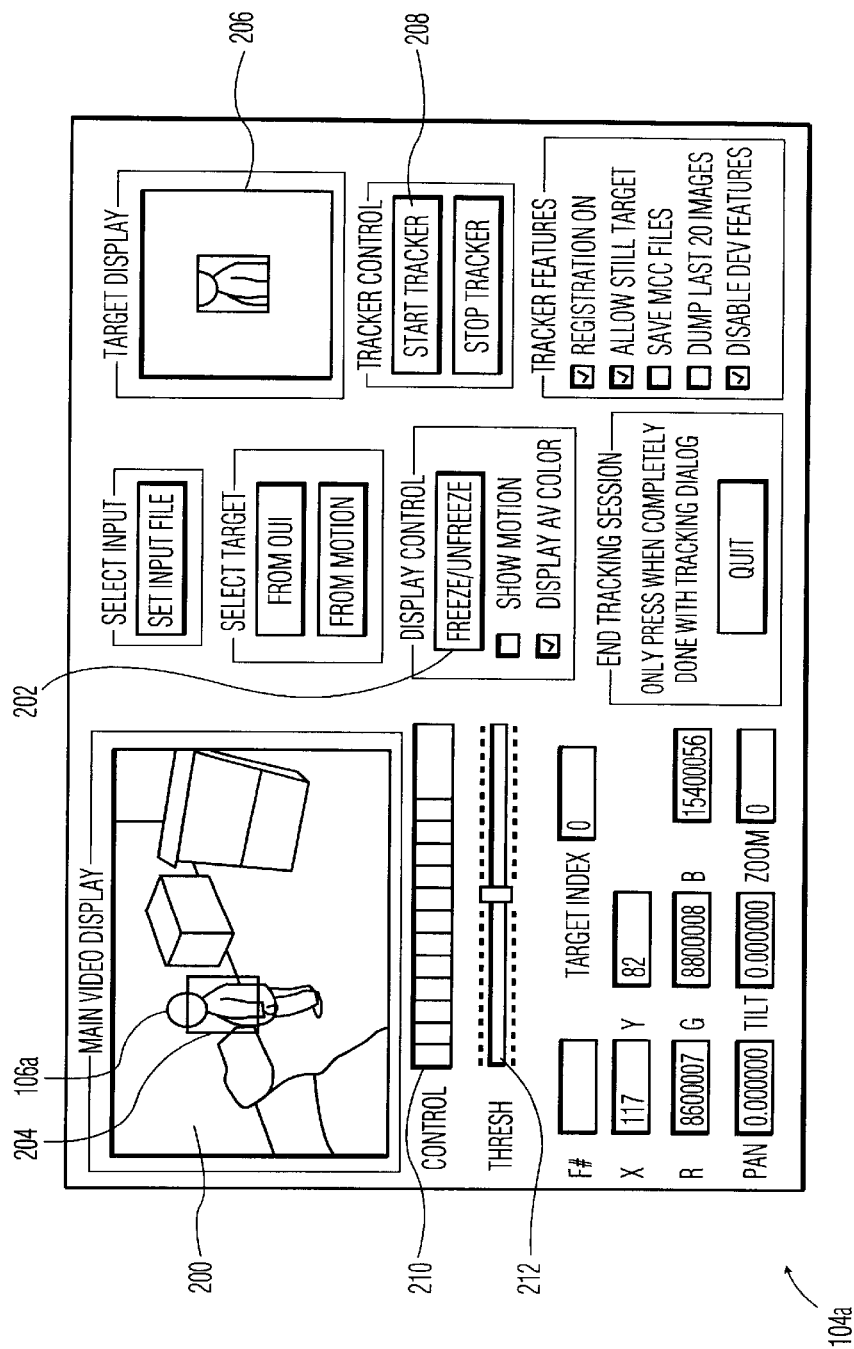
FIG. 2 illustrates a preferred method for selecting a target in the video tracking system of FIG. 1.

A further aspect of the apparatus for selecting the target will now be described with reference to FIG. 2. FIG. 2 illustrates in more detail the monitor display 104a of FIG. 1. The monitor display 104a is shown as having a windows environment. A portion of the video image display, referred to as a main video display 200, displays the video image data from the camera 102.

The target 106a is chosen in the main video display 200 as discussed above. However, to ensure the proper selection of the target 106a, the operator has the option of freezing the video image data to display a frame of such in the main video display portion 200 prior to selecting the target 106a. The video image data can be frozen by any number of means, preferably, by clicking on a freeze button 202 provided on the monitor display 104a. Alternatively, the operator can click on the main video display 200 to freeze the video.

After freezing the main video display 200, the operator can select a target 106a as discussed above, preferably by drawing rectangle 204 around at least a portion of the target 106a. Preferably, the monitor display 104a also includes a target display 206 which displays the selected target 106a. In a typical Microsoft Windows application, the rectangle 204 is drawn by placing the mouse pointer at the upper right of the target region, right clicking, and while holding the right button down, moving the mouse pointer to the lower left of the target region, and releasing the right mouse button. In selecting the target region (rectangle 204) the operator should try to include as little of the background as possible. When the button is released, a rectangle 204 will be drawn around the target region on the main video display 200, and the image region around the target will be copied to the target display 206.

Thus, if the operator is not satisfied with the selected target, he or she can select another one. After a satisfactory target 106a is selected, the operator unfreezes the main video display 200, by use of another button provided on the monitor display 104a or preferably by use of button 202. The tracking system then tracks the selected target either automatically after a satisfactory target is selected or manually by indicating such to the tracking system 116, such as by a button 208 provided on the monitor display 104a.

As discussed above, when the target 106a is selected, a computer model is build to represent the appearance of that target 106a. During tracking of the target 106a, whenever the tracker finds a part of the image that matches to the target model, it preferably computes a number which represents how well the target 106a matches the model. This number can vary for example from 0% match to 100% match. Where the 100% indicates that the target matches the model completely. This value is called the confidence value. An indicator can be added to the monitor display 104*a* of the tracker that indicates the confidence level 210. Furthermore, a control can also be added to the monitor display 104*a* for indicating a threshold value 212 for the confidence. Thus, should the model match the target with less than this threshold value, the tracker may warn the operator or stop tracking and consider that the target is lost.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for selecting a target in an automated video tracking system, the method comprising the steps of:

displaying video image data of a scene having a target to be tracked;

freezing the video image data of the scene having the target to be tracked to display a frame thereof; and selecting at least distinguishing image characteristics of the target relative to the entire scene in the frame of the frozen video image data.

2. The method of claim 1, further comprising the steps of:

unfreezing the video image data after the selecting step; and tracking the selected desired target in the unfrozen video image data.

3. The method of claim 1, wherein the selecting step comprises drawing a shape around at least a distinguishing portion of the desired target with an input device.

4. The method of claim 3, wherein the input device is a computer mouse and the shape is a rectangle.

5. The method of claim 1, wherein the selecting step comprises indicating a region in which the desired target resides with an input device.

6. The method of claim 5, wherein the input device is a computer mouse and the indicating step comprises clicking on the region.

7. An apparatus for selecting target in an automated video tracking system, the apparatus comprising:

a camera for providing video image data of a scene having a desired target to be tracked;

a display for displaying the video image data;

means for freezing the video image data of the scene having a target to be tracked to display a frame thereof; and an input device for selecting at least distinguishing image characteristics of the desired target relative to the entire scene in the frame of the frozen video image data.

8. The apparatus of claim 7, further comprising:

means for unfreezing the video image data after the image characteristics of the desired target are selected; and an automated video tracking system having a controller for controlling the camera to track the selected desired target in the unfrozen video image data.

9. The apparatus of claim 7, wherein the input device comprises means for drawing a shape around at least a portion of the desired target containing the distinguishing image characteristics.

10. The apparatus of claim 9, wherein the input device is a computer mouse and the shape is a rectangle.

11. The apparatus of claim 7, wherein the input device comprises means for indicating a region in which the desired target resides.

12. The apparatus of claim 11, wherein the input device is a computer mouse and the means for indicating comprises clicking on the region.

13. A video tracking system comprising:

a camera for providing video image data of a scene having a desired target to be tracked;

a display for displaying the video image data;

means for freezing the video image data of the scene having a target to be tracked to display a frame thereof;

an input device for selecting at least distinguishing image characteristics of the desired target relative to the entire scene in the frame of the frozen video image data;

means for unfreezing the video image data after the image characteristics of the desired target are selected; and a controller for controlling the camera to track the selected desired target in the unfrozen video image data.

14. The video tracking system of claim 13, wherein the input device comprises means for drawing a shape around at least a portion of the desired target containing the distinguishing image characteristics.

15. The video tracking system of claim 14, wherein the input device is a computer mouse and the shape is a rectangle.

16. The video tracking system of claim 13, wherein the input device comprises means for indicating a region in which the desired target resides.

17. The video tracking system of claim 16, wherein the input device is a computer mouse and the means for indicating comprises clicking on the region.

* * * * *